United States Patent
Tsai et al.

(10) Patent No.: US 12,457,702 B2
(45) Date of Patent: Oct. 28, 2025

(54) SERVER CHASSIS INCLUDING AN INTEGRATED POWER SUPPLY UNIT

(71) Applicant: Dell Products L.P., Round Rock, TX (US)

(72) Inventors: Meng-Ru Tsai, New Taipei (TW); Kunnan Chen, Taipei (TW); Ting-Chun Fong, New Taipei (TW)

(73) Assignee: Dell Products L.P., Round Rock, TX (US)

( * ) Notice: Subject to any disclaimer, the term of this patent is extended or adjusted under 35 U.S.C. 154(b) by 76 days.

(21) Appl. No.: 18/397,553

(22) Filed: Dec. 27, 2023

(65) Prior Publication Data

US 2025/0220844 A1  Jul. 3, 2025

(51) Int. Cl.
| | |
|---|---|
| *G06F 1/30* | (2006.01) |
| *G06F 1/26* | (2006.01) |
| *H02J 9/06* | (2006.01) |
| *H02M 7/00* | (2006.01) |
| *H02M 7/217* | (2006.01) |
| *H05K 7/14* | (2006.01) |

(52) U.S. Cl.
CPC ........... *H05K 7/1492* (2013.01); *G06F 1/263* (2013.01); *G06F 1/30* (2013.01); *H02J 9/061* (2013.01); *H02M 7/003* (2013.01); *H02M 7/217* (2013.01)

(58) Field of Classification Search
CPC .. G06F 1/263; G06F 1/30; G06F 1/305; H02J 1/10; H02J 1/12; H02J 9/06; H02J 9/061; H05K 7/1492
See application file for complete search history.

(56) References Cited

U.S. PATENT DOCUMENTS

| | | | | |
|---|---|---|---|---|
| 6,255,744 | B1* | 7/2001 | Shih | H02J 9/061 |
| | | | | 307/64 |
| 9,047,076 | B1* | 6/2015 | Lee | G06F 1/263 |
| 2005/0156568 | A1* | 7/2005 | Yueh | H02J 9/062 |
| | | | | 320/128 |
| 2007/0007824 | A1* | 1/2007 | Chen | H02J 9/061 |
| | | | | 307/66 |
| 2007/0278860 | A1* | 12/2007 | Krieger | H02J 9/061 |
| | | | | 307/64 |

(Continued)

*Primary Examiner* — Levi Gannon
(74) *Attorney, Agent, or Firm* — McDermott Will & Schulte LLP (57) ABSTRACT

A server chassis, including: a server motherboard; a PSU positioned within a first enclosure of the server chassis, the PSU including: a control board coupled to the server motherboard; a hot-pluggable rectifier; a charge control management module coupled to the control board; a battery pack positioned within a second enclosure of the server chassis, the battery pack coupled to the charge control management module, wherein, when the hot-pluggable rectifier is coupled to the control board and an AC source is coupled to the hot-pluggable rectifier, i) the hot-pluggable rectifier provides power to the server motherboard through the control board and ii) stores energy, via the charge control management module, at the battery pack, wherein, when the hot-pluggable rectifier is de-coupled from the control board and/or the AC source is de-coupled from the hot-pluggable rectifier, the battery pack provides power to the server motherboard via the charge control management module.

12 Claims, 10 Drawing Sheets

(56) References Cited

U.S. PATENT DOCUMENTS

| | | | | |
|---|---|---|---|---|
| 2013/0198534 | A1* | 8/2013 | Bailey | H02J 9/00 |
| | | | | 713/300 |
| 2013/0227310 | A1* | 8/2013 | Jau | G06F 1/26 |
| | | | | 713/300 |
| 2016/0011887 | A1* | 1/2016 | Chung | G06F 8/654 |
| | | | | 713/2 |
| 2016/0352141 | A1* | 12/2016 | Cheng | H02J 9/061 |
| 2017/0242465 | A1* | 8/2017 | Kelly | G06F 1/26 |

* cited by examiner

SERVER CHASSIS INCLUDING AN INTEGRATED POWER SUPPLY UNIT

BACKGROUND

Field of the Disclosure

The disclosure relates generally to a server chassis including an integrated power supply unit.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes, thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

SUMMARY

Innovative aspects of the subject matter described in this specification may be embodied in a server chassis, including: a server motherboard; a power supply unit (PSU) positioned within a first enclosure of the server chassis, the PSU including: a control board coupled to the server motherboard; a hot-pluggable rectifier; a charge control management module coupled to the control board; and a battery pack positioned within a second enclosure of the server chassis, the battery pack coupled to the charge control management module, wherein, when the hot-pluggable rectifier is coupled to the control board and an AC source is coupled to the hot-pluggable rectifier, i) the hot-pluggable rectifier provides power to the server motherboard through the control board and ii) stores energy, via the charge control management module, at the battery pack, wherein, when the hot-pluggable rectifier is de-coupled from the control board and/or the AC source is de-coupled from the hot-pluggable rectifier, the battery pack provides power to the server motherboard via the charge control management module.

Other embodiments of these aspects include corresponding systems and apparatus.

These and other embodiments may each optionally include one or more of the following features. For instance, the control board of the PSU includes: a first capacitor coupled to the hot-pluggable rectifier; and a first voltage regulator coupled to the first capacitor and the hot-pluggable rectifier, wherein, when the hot-pluggable rectifier is coupled to the control board and the AC source is coupled to the hot-pluggable rectifier: the hot-pluggable rectifier maintains a first voltage on the first capacitor, the first voltage on the first capacitor is input to the first voltage regulator, and the first voltage regulator provides power to the server motherboard. The control board of the PSU includes: a second capacitor coupled to the hot-pluggable rectifier; and a second voltage regulator coupled to the second capacitor and the hot-pluggable rectifier, wherein, when the hot-pluggable rectifier is de-coupled from the control board and/or the AC source is de-coupled from the hot-pluggable rectifier: the battery pack maintains a second voltage on the second capacitor, the second voltage on the second capacitor is input to the second voltage regulator, and the second voltage regulator provides power to the server motherboard. The hot-pluggable rectifier includes a first edge board, the charge control management module includes a second edge board, wherein the hot-pluggable rectifier is coupled to the control board via the first edge board, wherein the charge control management module is coupled to the control board via the second edge board. The PSU includes a third edge board, wherein the PSU is coupled to the server motherboard via the third edge board. The battery pack includes a plurality of battery cells connected in serial as a single string. The battery pack is coupled to the charge control management module via a power cable.

The details of one or more embodiments of the subject matter described in this specification are set forth in the accompanying drawings and the description below. Other potential features, aspects, and advantages of the subject matter will become apparent from the description, the drawings, and the claims.

DESCRIPTION OF PARTICULAR EMBODIMENT(S)

This disclosure discusses a server chassis including an integrated power supply unit. In short, a power supply unit (PSU) can serve as an uninterruptible power supply (UPS) for a server motherboard. A battery pack can store energy on capacitors that are used to maintain high voltage input to voltage regulators and output to a server motherboard. A charge control management module can control discharge/charge operation according to the status of the AC input voltage readiness of an AC source and an enablement of a rectifier of the PSU. When the rectifier is unplugged, the energy at the battery pack can be utilized and in a discharge mode for providing power to the server motherboard, described further herein.

Specifically, this disclosure discusses a server chassis, including a server motherboard; a power supply unit (PSU) positioned within a first enclosure of the server chassis, the PSU including: a control board coupled to the server motherboard; a hot-pluggable rectifier; a charge control management module coupled to the control board; a battery pack positioned within a second enclosure of the server chassis, the battery pack coupled to the charge control management module, wherein, when the hot-pluggable rectifier is coupled to the control board and an AC source is coupled to the hot-pluggable rectifier, i) the hot-pluggable rectifier provides power to the server motherboard through the control board and ii) stores energy, via the charge control management module, at the battery pack, wherein, when the hot-pluggable rectifier is de-coupled from the control board and/or the AC source is de-coupled from the hot-pluggable rectifier, the battery pack provides power to the server motherboard via the charge control management module.

In the following description, details are set forth by way of example to facilitate discussion of the disclosed subject matter. It should be apparent to a person of ordinary skill in the field, however, that the disclosed embodiments are exemplary and not exhaustive of all possible embodiments.

For the purposes of this disclosure, an information handling system may include an instrumentality or aggregate of instrumentalities operable to compute, classify, process, transmit, receive, retrieve, originate, switch, store, display, manifest, detect, record, reproduce, handle, or utilize various forms of information, intelligence, or data for business, scientific, control, entertainment, or other purposes. For example, an information handling system may be a personal computer, a PDA, a consumer electronic device, a network storage device, or another suitable device and may vary in size, shape, performance, functionality, and price. The information handling system may include memory, one or more processing resources such as a central processing unit (CPU) or hardware or software control logic. Additional components of the information handling system may include one or more storage devices, one or more communications ports for communicating with external devices as well as various input and output (I/O) devices, such as a keyboard, a mouse, and a video display. The information handling system may also include one or more buses operable to transmit communication between the various hardware components.

For the purposes of this disclosure, computer-readable media may include an instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory (SSD); as well as communications media such wires, optical fibers, microwaves, radio waves, and other electromagnetic and/or optical carriers; and/or any combination of the foregoing.

Particular embodiments are best understood by reference to FIGS. 1-11 wherein like numbers are used to indicate like and corresponding parts.

Figure 1:
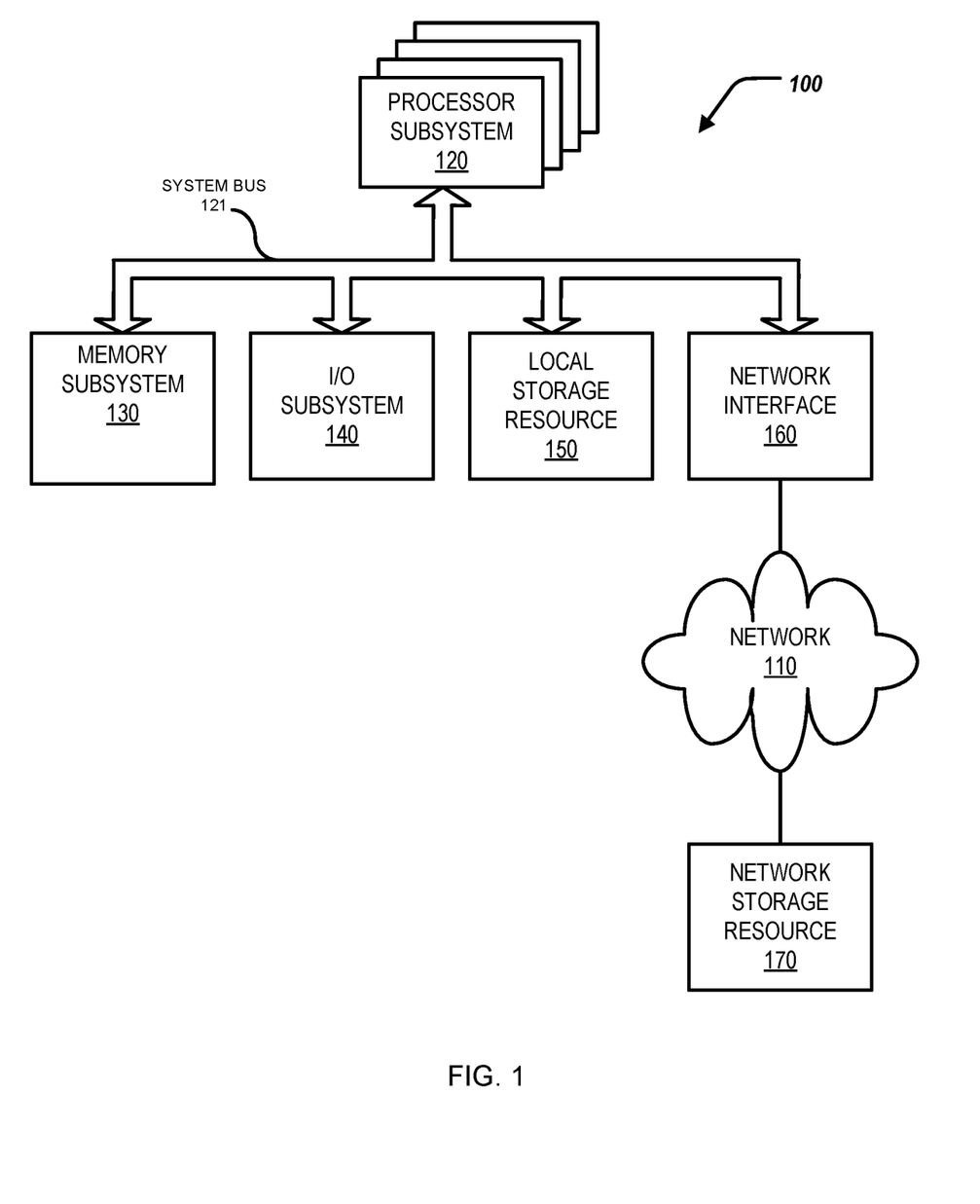
FIG. 1 is a block diagram of selected elements of an embodiment of an information handling system.

Turning now to the drawings, FIG. 1 illustrates a block diagram depicting selected elements of an information handling system 100 in accordance with some embodiments of the present disclosure. In various embodiments, information handling system 100 may represent different types of portable information handling systems, such as, display devices, head mounted displays, head mount display systems, smart phones, tablet computers, notebook computers, media players, digital cameras, 2-in-1 tablet-laptop combination computers, and wireless organizers, or other types of portable information handling systems. In one or more embodiments, information handling system 100 may also represent other types of information handling systems, including desktop computers, server systems, controllers, and microcontroller units, among other types of information handling systems. Components of information handling system 100 may include, but are not limited to, a processor subsystem 120, which may comprise one or more processors, and system bus 121 that communicatively couples various system components to processor subsystem 120 including, for example, a memory subsystem 130, an I/O subsystem 140, a local storage resource 150, and a network interface 160. System bus 121 may represent a variety of suitable types of bus structures, e.g., a memory bus, a peripheral bus, or a local bus using various bus architectures in selected embodiments. For example, such architectures may include, but are not limited to, Micro Channel Architecture (MCA) bus, Industry Standard Architecture (ISA) bus, Enhanced ISA (EISA) bus, Peripheral Component Interconnect (PCI) bus, PCI-Express bus, HyperTransport (HT) bus, and Video Electronics Standards Association (VESA) local bus.

As depicted in FIG. 1, processor subsystem 120 may comprise a system, device, or apparatus operable to interpret and/or execute program instructions and/or process data, and may include a microprocessor, microcontroller, digital signal processor (DSP), application specific integrated circuit (ASIC), or another digital or analog circuitry configured to interpret and/or execute program instructions and/or process data. In some embodiments, processor subsystem 120 may interpret and/or execute program instructions and/or process data stored locally (e.g., in memory subsystem 130 and/or another component of information handling system). In the same or alternative embodiments, processor subsystem 120 may interpret and/or execute program instructions and/or process data stored remotely (e.g., in network storage resource 170).

Also in FIG. 1, memory subsystem 130 may comprise a system, device, or apparatus operable to retain and/or retrieve program instructions and/or data for a period of time (e.g., computer-readable media). Memory subsystem 130 may comprise random access memory (RAM), electrically erasable programmable read-only memory (EEPROM), a PCMCIA card, flash memory, magnetic storage, opto-magnetic storage, and/or a suitable selection and/or array of volatile or non-volatile memory that retains data after power to its associated information handling system, such as system 100, is powered down.

In information handling system 100, I/O subsystem 140 may comprise a system, device, or apparatus generally operable to receive and/or transmit data to/from/within information handling system 100. I/O subsystem 140 may represent, for example, a variety of communication interfaces, graphics interfaces, video interfaces, user input interfaces, and/or peripheral interfaces. In various embodiments, I/O subsystem 140 may be used to support various peripheral devices, such as a touch panel, a display adapter, a keyboard, an accelerometer, a touch pad, a gyroscope, an IR sensor, a microphone, a sensor, or a camera, or another type of peripheral device.

Local storage resource 150 may comprise computer-readable media (e.g., hard disk drive, floppy disk drive, CD-ROM, and/or other types of rotating storage media, flash memory, EEPROM, and/or another type of solid state storage media) and may be generally operable to store instructions and/or data. Likewise, the network storage resource may comprise computer-readable media (e.g., hard disk drive, floppy disk drive, CD-ROM, and/or other types of rotating storage media, flash memory, EEPROM, and/or other types of solid state storage media) and may be generally operable to store instructions and/or data.

In FIG. 1, network interface 160 may be a suitable system, apparatus, or device operable to serve as an interface between information handling system 100 and a network 110. Network interface 160 may enable information handling system 100 to communicate over network 110 using a suitable transmission protocol and/or standard, including, but not limited to, transmission protocols and/or standards enumerated below with respect to the discussion of network 110. In some embodiments, network interface 160 may be communicatively coupled via network 110 to a network storage resource 170. Network 110 may be a public network or a private (e.g., corporate) network. The network may be implemented as, or may be a part of, a storage area network (SAN), personal area network (PAN), local area network (LAN), a metropolitan area network (MAN), a wide area network (WAN), a wireless local area network (WLAN), a virtual private network (VPN), an intranet, the Internet or another appropriate architecture or system that facilitates the communication of signals, data and/or messages (generally referred to as data). Network interface 160 may enable wired and/or wireless communications (e.g., NFC or Bluetooth) to and/or from information handling system 100.

In particular embodiments, network 110 may include one or more routers for routing data between client information handling systems 100 and server information handling systems 100. A device (e.g., a client information handling system 100 or a server information handling system 100) on network 110 may be addressed by a corresponding network address including, for example, an Internet protocol (IP) address, an Internet name, a Windows Internet name service (WINS) name, a domain name or other system name. In particular embodiments, network 110 may include one or more logical groupings of network devices such as, for example, one or more sites (e.g., customer sites) or subnets. As an example, a corporate network may include potentially thousands of offices or branches, each with its own subnet (or multiple subnets) having many devices. One or more client information handling systems 100 may communicate with one or more server information handling systems 100 via any suitable connection including, for example, a modem connection, a LAN connection including the Ethernet or a broadband WAN connection including DSL, Cable, Ti, T3, Fiber Optics, Wi-Fi, or a mobile network connection including GSM, GPRS, 3G, or WiMax.

Network 110 may transmit data using a desired storage and/or communication protocol, including, but not limited to, Fibre Channel, Frame Relay, Asynchronous Transfer Mode (ATM), Internet protocol (IP), other packet-based protocol, small computer system interface (SCSI), Internet SCSI (iSCSI), Serial Attached SCSI (SAS) or another transport that operates with the SCSI protocol, advanced technology attachment (ATA), serial ATA (SATA), advanced technology attachment packet interface (ATAPI), serial storage architecture (SSA), integrated drive electronics (IDE), and/or any combination thereof. Network 110 and its various components may be implemented using hardware, software, or any combination thereof.

Figure 2:
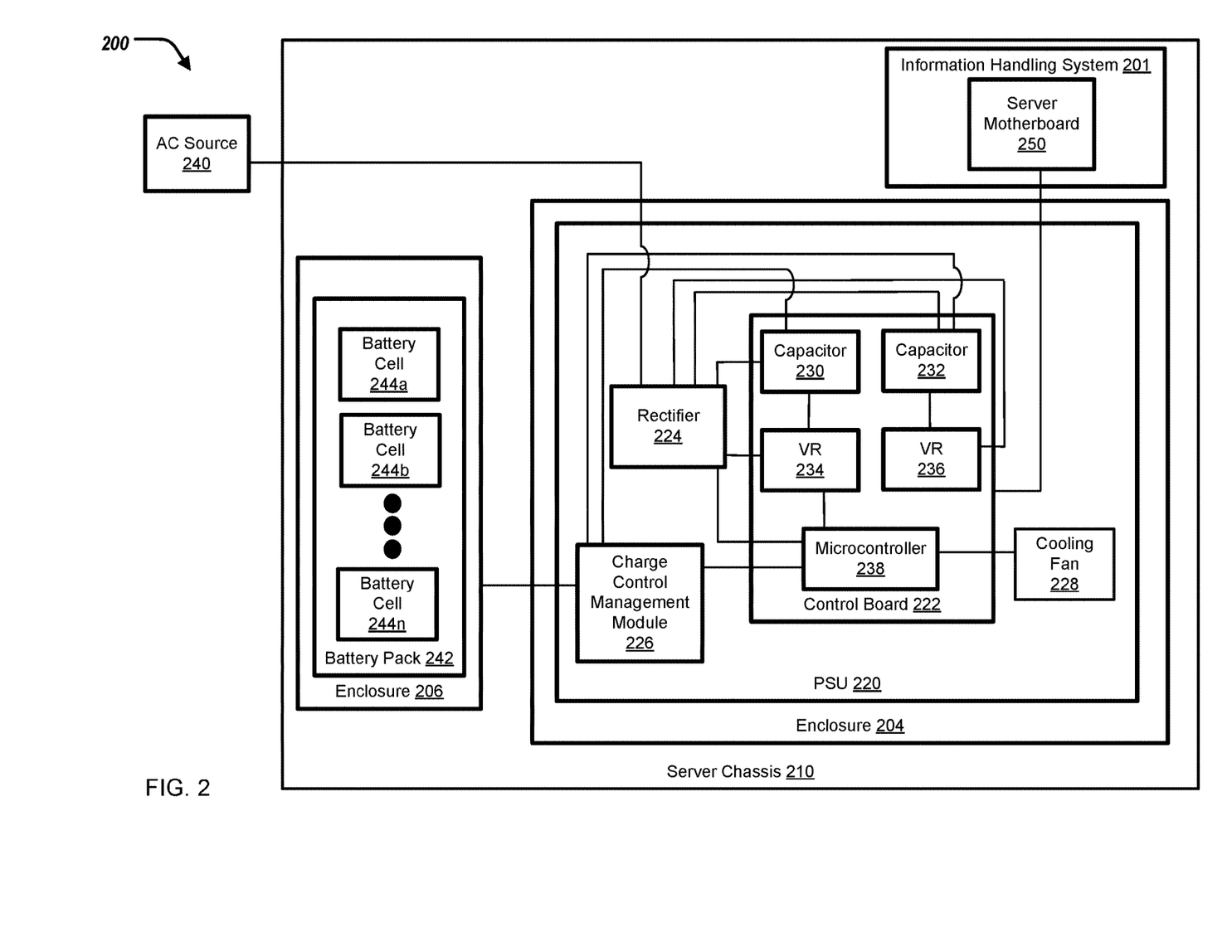
FIG. 2 illustrates a block diagram of a server chassis.

Turning to FIG. 2, FIG. 2 illustrates an environment 200 including a server chassis 210. The server chassis 210 can include a first enclosure 204 and a second enclosure 206. In some examples, the server chassis 210 can include one or more components of the information handling system 100 of FIG. 1. In some examples, the server chassis 210 can further include the information handling system 201, similar to the information handling system 100 of FIG. 1. The information handling system 201 can include a server motherboard 250.

The first enclosure 204 can include a power supply unit (PSU) 220. That is, the PSU 220 can be (physically) positioned within the first enclosure 204. The PSU 220 can include a control board 222, a hot-pluggable rectifier 224 (or rectifier 224), a charge control management module 226, and a cooling fan 228. The control board 222 can include a first capacitor 230, a second capacitor 232, a first voltage regulator (VR) 234, a second voltage regulator (VR) 236, and a microcontroller unit (MCU) 238.

The second enclosure 206 can include a battery pack 242. That is, the battery pack 242 can be (physically) positioned within the second enclosure 206. The battery pack 242 can include a plurality of battery cells 244a, 244b, . . . , 244c (collectively referred to as battery cells 244).

The rectifier 224 can be connected to the first capacitor 230, the second capacitor 232, the first VR 234, the second VR 236, and the MCU 238. Further, the rectifier 224 can be connected to an AC source 240. The charge control management module 226 can be connected to the battery pack 242, the first capacitor 230, the second capacitor 232, and the microcontroller 238. The cooling fan 228 can be connected to the microcontroller 238.

The microcontroller 238 can be connected to the rectifier 224, the charge control module 226, the cooling fan 228, and the first VR 234. The first VR 234 can be connected to the first capacitor 230 and the rectifier 224. The second VR 236 can be connected to the second capacitor 232 and the rectifier 224. The first capacitor 230 can be connected to the charge control management module 234, the rectifier 224, and the first VR 234. The second capacitor 232 can be connected to the charge control management module 226, the rectifier 224, and the second VR 236.

In short, the PSU 220 can serve as uninterruptible power supply (UPS) for the server motherboard 250. The battery pack 242 can store energy on capacitors that are used to maintain high voltage input to the voltage regulators and output to the server motherboard 250. The charge control management module 226 can control discharge/charge operation according to the status of the AC input voltage readiness of the AC source 244 and the enablement of the rectifier 224. When the rectifier 224 is unplugged, the energy at the battery pack 252 can be utilized and in a discharge mode for providing power to the server motherboard 250.

Figure 3:
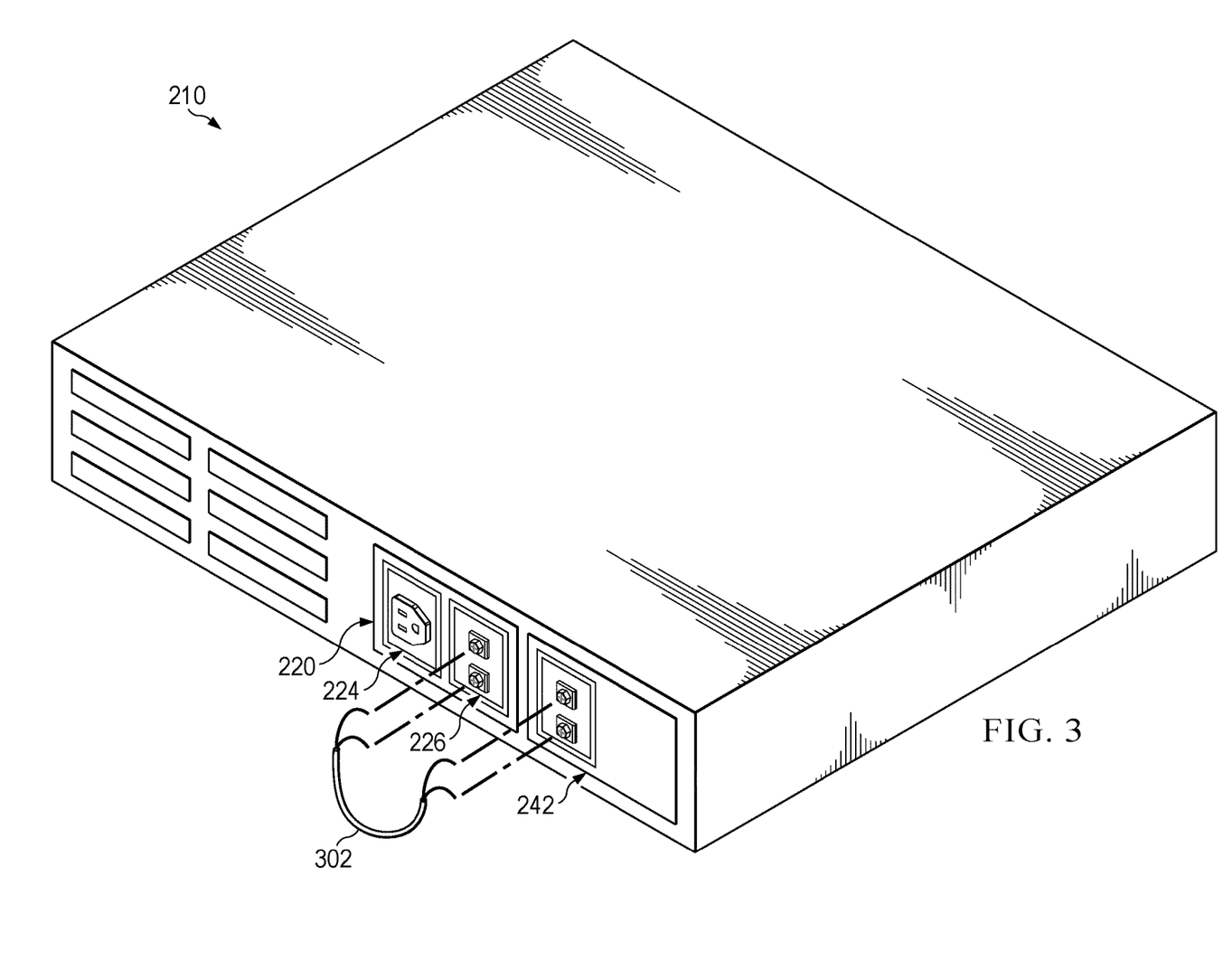
FIG. 3 illustrates a perspective view of the server chassis.

FIG. 3 illustrates a perspective view of the server chassis 210. The server chassis 210 can include the PSU 220 (physically positioned within the enclosure 204), and include the battery pack 242 (physically positioned within the enclosure 206). The PSU 220 can include the rectifier 224 and the charge control management module 226. A power cable 302 couples the battery pack 242 to the PSU 220, and specifically, couples the charge control management module 242 to the battery pack 242.

Figure 4:
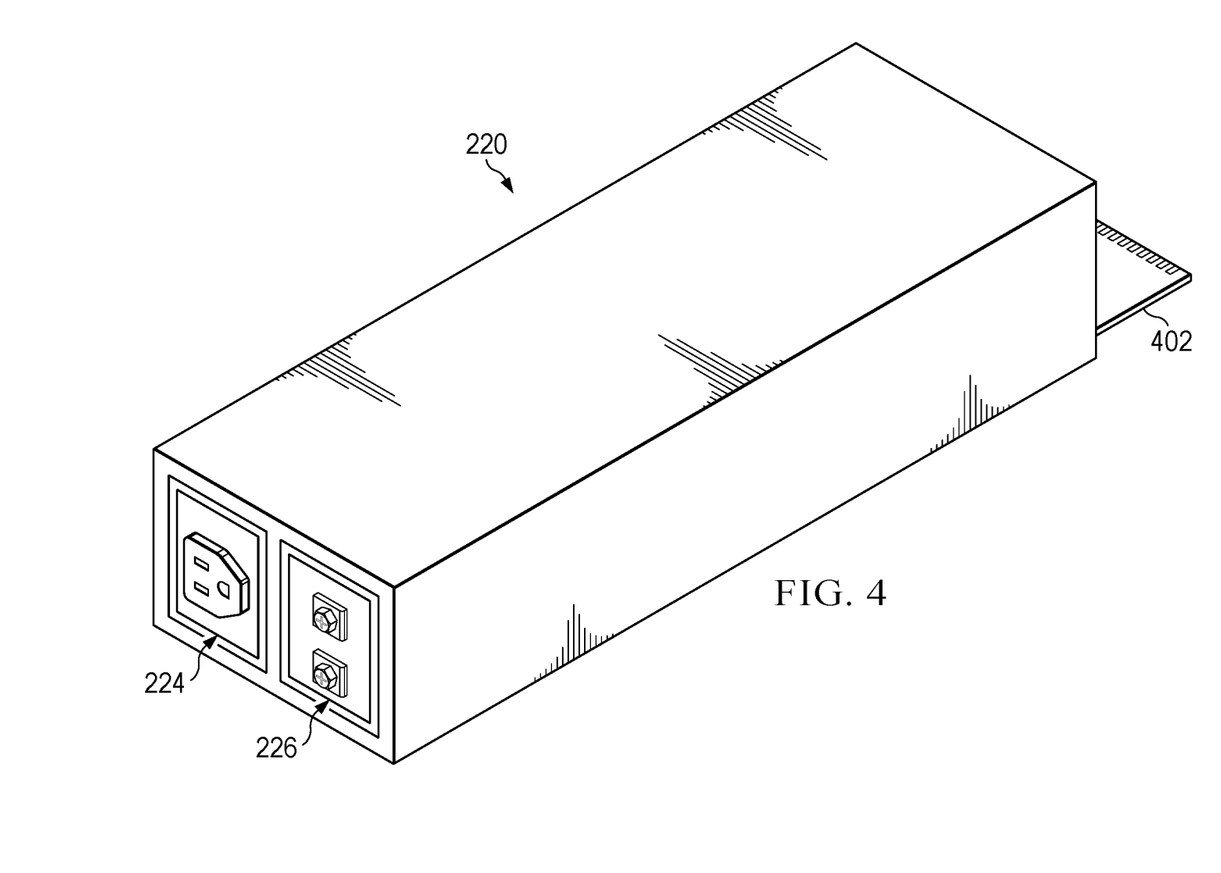
FIG. 4 illustrates a perspective view of a power supply unit (PSU) of the server chassis with an embedded battery charge control management module.

FIG. 4 illustrates a perspective view of the PSU 220. The PSU 220 includes the rectifier 224 and the charge control management module 226. The PSU 220 further includes an edge board 402. The PSU 220 is coupled to the server motherboard 250 via the edge board 402. In particular, the control board 222 of the PSU 220 is coupled to the server motherboard 250 via the edge board 402.

Figure 5:
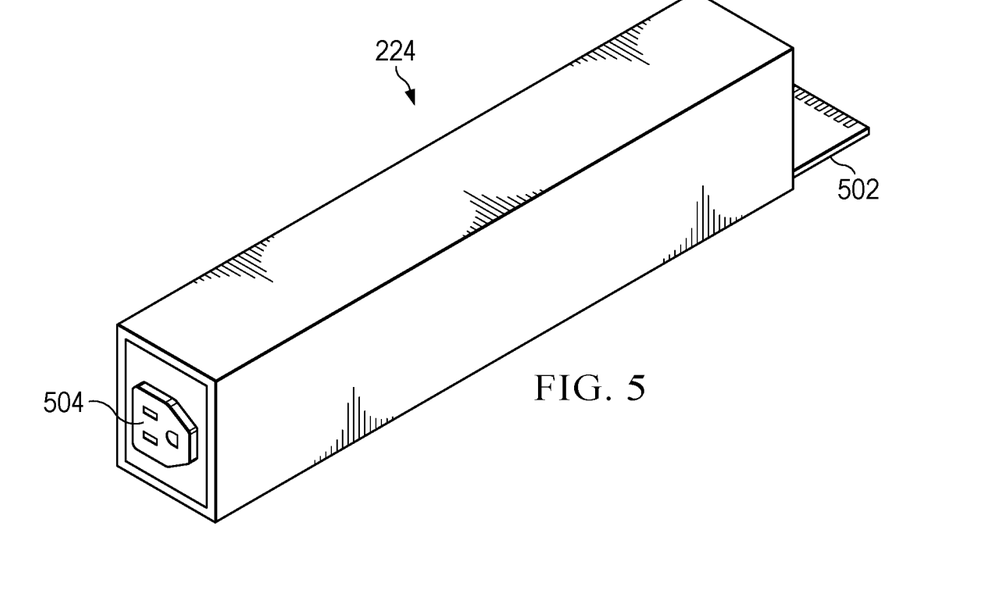
FIG. 5 illustrates a perspective view of a hot-pluggable rectifier of the PSU.

FIG. 5 illustrates a perspective view of the rectifier 224. The rectifier 224 can include an edge board 502. The rectifier 224 is coupled to the control board 222 via the edge board 502. The rectifier 224 can include an inlet connector 504 (e.g., a C14 inlet connector).

Figure 6:
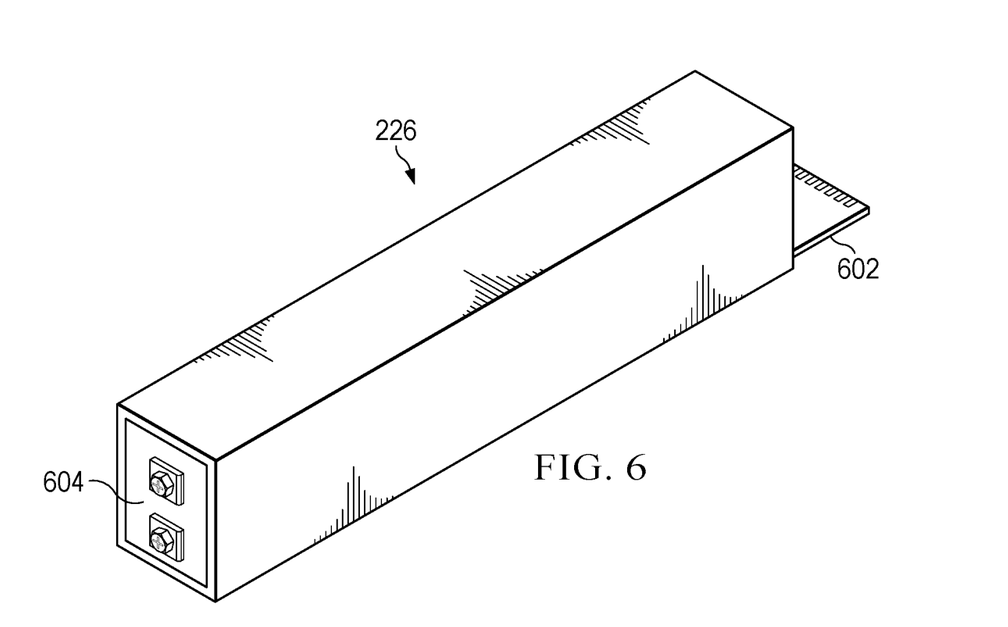
FIG. 6 illustrates a perspective view of a charge control management module of the PSU.

FIG. 6 illustrates a perspective view of the charge control management module 226. The charge control management module 226 can include an edge board 602. The charge control management module 226 is coupled to the control board 222 via the edge board 602. The charge control management module 226 can include an inlet connector 604.

Figure 7:
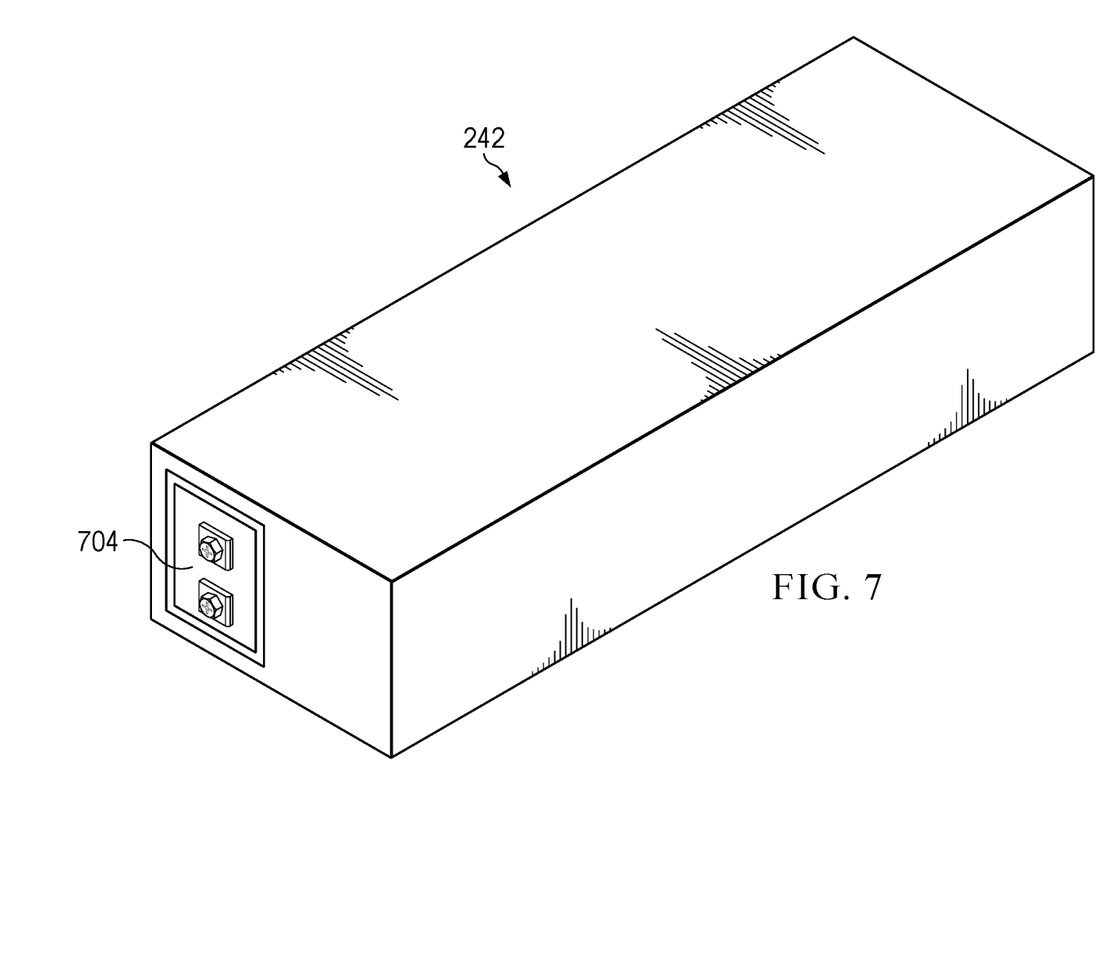
FIG. 7 illustrates a battery pack fitting in a the PSU enclosure from the PSU DC bulk voltage energy storing.

FIG. 7 illustrates a perspective view of the battery pack 242. The battery pack 242 can include an inlet connector 704. The battery pack 242 can be coupled to the charge control management module 226 via the power cable 302, with the power cable 302 being coupled to the inlet connector 604 of the charge control management module 226 and the inlet connector 704 of the battery pack 242.

Figure 8:
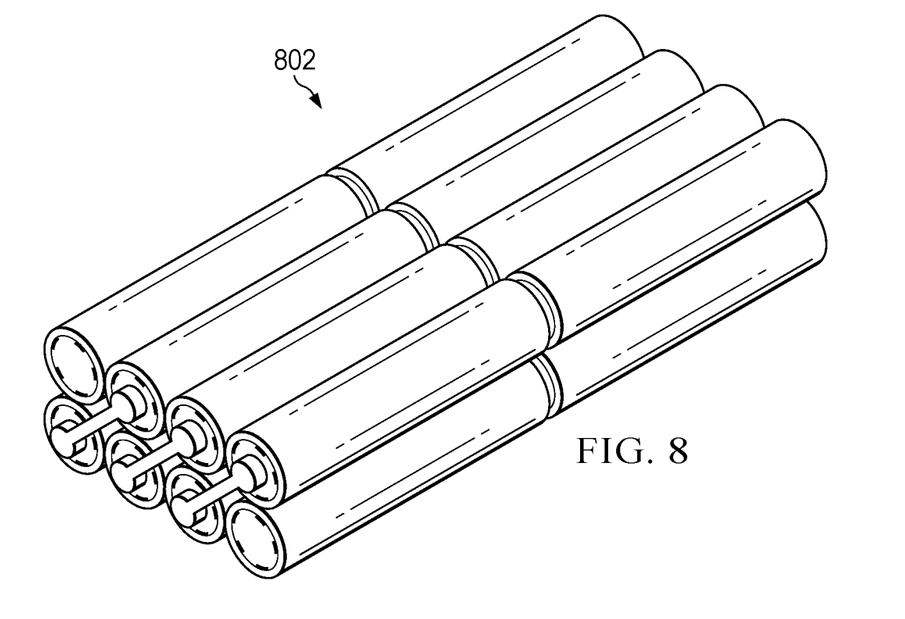
FIG. 8 illustrates a battery pack with battery cells connected in series.

FIG. 8 illustrates a plurality of battery cells 802 that form the battery pack 242. The battery cells 802 can be connected in serial as a single string.

Referring back to FIG. 2, when the rectifier 224 is coupled to the control board 222 and the AC source 240 is coupled to the rectifier 224 (and providing power to the rectifier 224), the rectifier 224 provides power to the server motherboard 250 through the control board 222. Specifically, the rectifier 224 maintains a first voltage on/at the first capacitor 230. Further, the first voltage at the first capacitor 230 is input to the first voltage regulator 234. The first voltage regulator 234 provides power to the server motherboard 250. For example, 54 Volts (DC) energy that is output from the rectifier 224 is to maintain a 54V DC voltage on the first capacitor 230. The 54V DC on the first capacitor 230 is the input source of the first voltage regulator 234 to output 12V DC to the server motherboard 250.

Furthermore, when the rectifier 224 is coupled to the control board 222 and the AC source 240 is coupled to the rectifier 224 (and providing power to the rectifier 224), the rectifier 224 stores energy, via the charge control management module 226, at the battery pack 242. In particular, the rectifier 224 charges the battery pack 242 through the control board 222 and the charge control management module 226. For example, the charge control management module 226 facilitates storing 54V of energy at the battery pack 242. In some examples, each of the battery cells 802, shown in FIG. 8, are charged at the same time (concurrently). This provides a balanced battery life and capacity to the battery cells 802 as each of the battery cells 802 operate in the same charge/discharge cycle.

When the rectifier 224 is de-coupled from the control board 222 and/or the AC source 240 is de-coupled from the rectifier 224, the battery pack 242 provides power to the server motherboard 250 via the charge control management module 226. Specifically, the battery pack 242 maintains a second voltage on/at the second capacitor 232. Further, the second voltage at the second capacitor 232 is input to the second voltage regulator 236. The second voltage regulator 236 provides power to the server motherboard 250. For example, 54 Volts (DC) energy that is output from the battery pack 242 is to maintain a 54V DC voltage on the second capacitor 232. The 54V DC on the second capacitor 232 is the input source of the second voltage regulator 236 to output 12V DC to the server motherboard 250. For example, when the rectifier module 224 is unplugged, the battery pack 242 can be switched to discharge mode to keep power at the server motherboard 250 for a short period until AC input is recovered or the rectifier 224 is re-installed at the enclosure 204.

In some examples, the edge board 502 and/or the edge board 602 can be physically in superimposition with the cooling fan 228.

Figure 9:
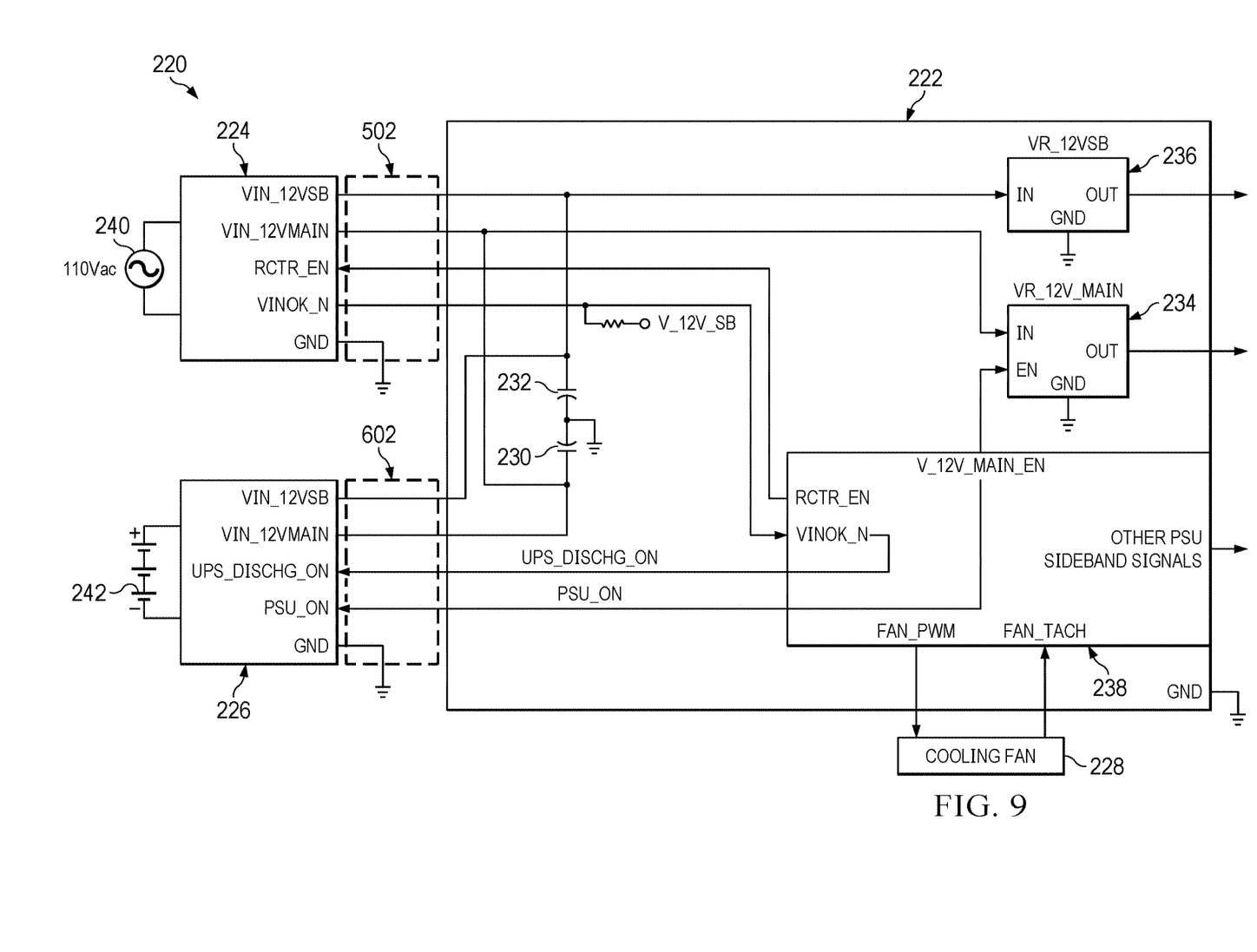
FIG. 9 illustrates a schematic view of the PSU.

FIG. 9 illustrates a schematic view of the server chassis 210, in a use case example. Specifically, when AC 110V input is ready (AC source 240), signal "VINOK_N" stays low to indicate that the AC input (AC source 240) is ready. The signal "RCTR_EN" is controlled by the microcontroller 238 when the PSU 220 is enabled to output "V_12V_MAIN" to the server motherboard 250. The "VIN_12VMAIN" from the rectifier 224 is a DC voltage (e.g., 54V) and can maintain the voltage on the first capacitor 230. It is the input voltage of the VR_12V_MAIN voltage regulator 234 to output V_12V_MAIN. Once the VIN_12VMAIN voltage is high enough and the V_12V_MAIN_EN is triggered as high, the PSU 220 would start to output V_12V_MAIN voltage to the server motherboard 250.

The charge control management module 226 is connected the battery pack 242 (e.g., 54V) through the power cable 302 (e.g., a 2-wire power cable). When the VINOK_N signal is low, this signal is also used by the microcontroller 238 to control the signal "UPS_DISCHG_ON." When UPS_DISCHG_ON is low due to the low state on VINOK_N, the discharge operation in the charge control management module 226 would be disabled. Therefore, the charge control management module 226 would stay in charge mode to store energy to the battery pack 242.

During charge mode, if the V_12V_MAIN_EN and PSU_ON signal are low, the battery pack 242 would be charged by VIN_12VSB source as the PSU 222 is in standby mode and only outputs 12V standby voltage. Thus, the RCTR_EN signal would be low and the VIN_12VMAIN is no output. In the opposite, if V_12V_MAIN_EN and PSU_ON are high, the battery charge source would be switched from VIN_12VSB to VIN_12VMAIN.

The battery charge/discharge operation is controlled by signal UPS_DISCHG_ON. When it is low, the battery pack 242 is in charge mode and the PSU_ON signal control of the charge source would be from VIN_12VSB or VIN_12VMAIN. When UPS_DISCHG_ON is high, the battery pack 242 is switched to discharge mode. The VIN_12VSB discharge path and VIN_12VMAIN discharge path are separated. The VIN_12VSB discharge path would be enabled and the connection is enabled directly when UPS_DISCHARGE_ON signal is high. The VIN_12VMAIN discharge path would be enabled only when the PSU_ON is high as well as it means the PSU 220 is in V_12V_MAIN output operation mode, not just V_12V_SB output.

At the microcontroller 238, the UPS_DISCHG_ON signal is connected to the VINOK_N signal from the rectifier 224. The high level on VINOK_N signal drives UPS_DISCHG_ON to high level to trigger battery pack 242 in discharge mode and maintain the voltage on the capacitor 232 as well.

The VIN_12VMAIN voltage discharge path in the charge control management module 226 would be switched to discharge mode only when both the VINOK_N and PSU_ON signals stay as high. The PSU_ON signal is controlled by the signal V_12V_MAIN_EN to indicate that the PSU 220 is supplying the "V_12V_MAIN" voltage to the server motherboard 250. When VIN_12VMAIN discharge path is enabled, it would maintain the voltage on the capacitor 230. Thus, the voltage regulator 234 is outputting the high current V_12V_MAIN power to server motherboard 250.

The rectifier 224 is a hot-pluggable design. When the rectifier 224 is unplugged, the charge control management module 226 would switch to discharge mode for a short period. The discharge time would be based on the battery capacity design of the battery pack 242 and the loading status on the server motherboard 250.

Figure 10:
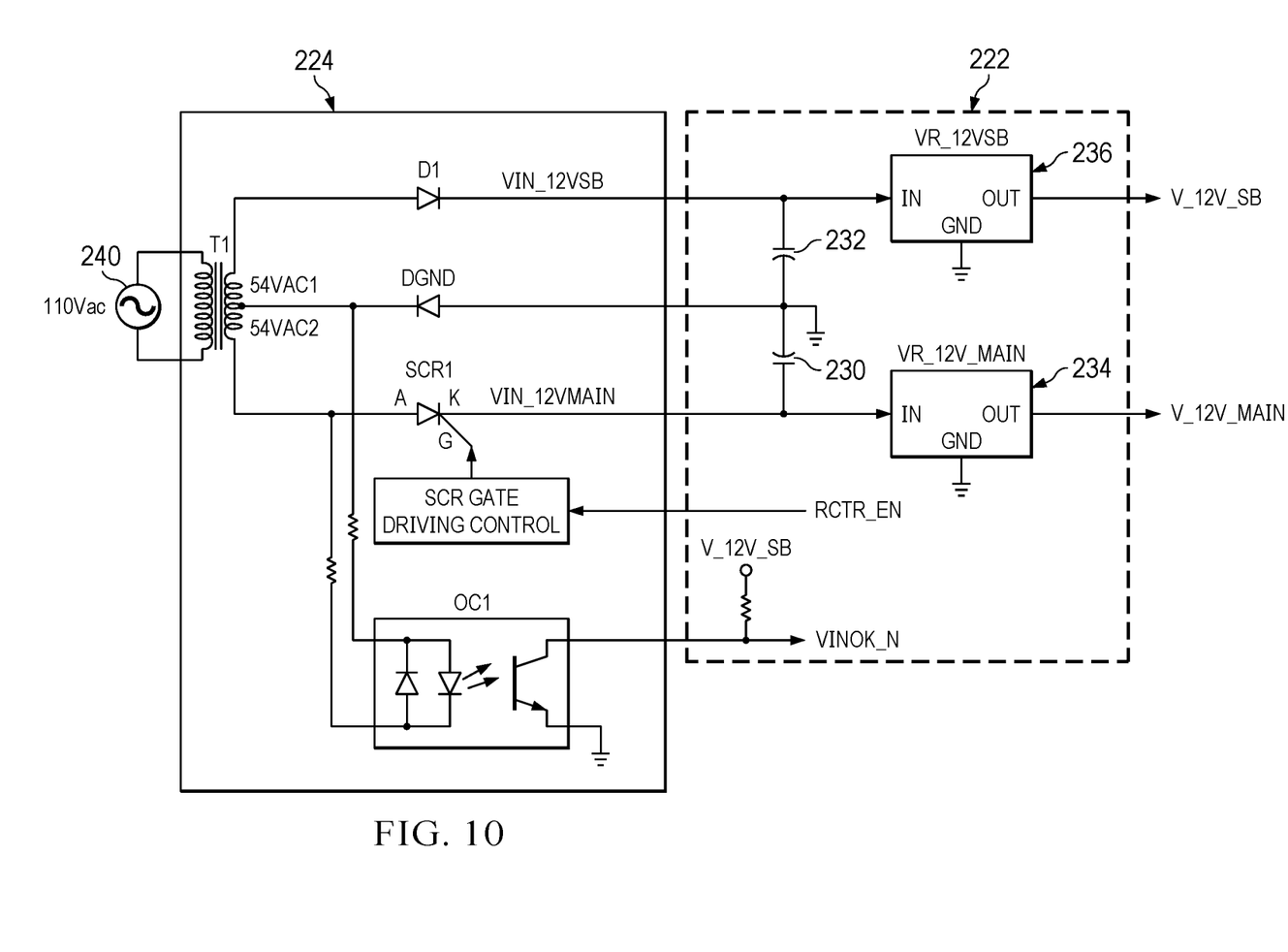
FIG. 10 illustrates a schematic view of the rectifier of the PSU.

FIG. 10 illustrates a schematic view of the rectifier 224, continuing the use case example. A center tap transformer (T1) generates two 54V AC voltages on the secondary side. The 54Vac1 is used to maintain the DC voltage on the capacitor 236 as the input source of V_12V_SB voltage regulator and 54Vac2 is for the voltage regulator 230. When 54Vac1 is in a positive cycle, D1 and DGND operate in ON state to maintain DC voltage VIN_12VSB on capacitor 236. It keeps the voltage regulator 232 operating to supply the 12V standby power output from PSU 220 to server motherboard 250. When AC voltage 54Vac2 is in a negative cycle, it requires SCR1 to be enabled by SCR Gate Driving control block to make VGK>0.6V~0.8V and generate IG current. When VAK is high enough to trigger SCR1 and DGND entering to ON state, then it would maintain the 54V DC voltage VIN_12VMAIN on capacitor 230. It keeps the voltage regulator 230, operating in 12V_main power suppling mode to the server motherboard 250. The SCR Gate Driving control block is controlled by a RCTR_EN signal from the microcontroller 238. It can only be enabled when VINOK_N is low to indicate that input voltage is ready. A photo coupler, OC1, is used to detect 54Vac2 is ready as an input voltage ready indication signal. It's pulled up to V_12V_SB. When VINOK_N signal is low state, it means the 54Vac2 is ready.

Figure 11:
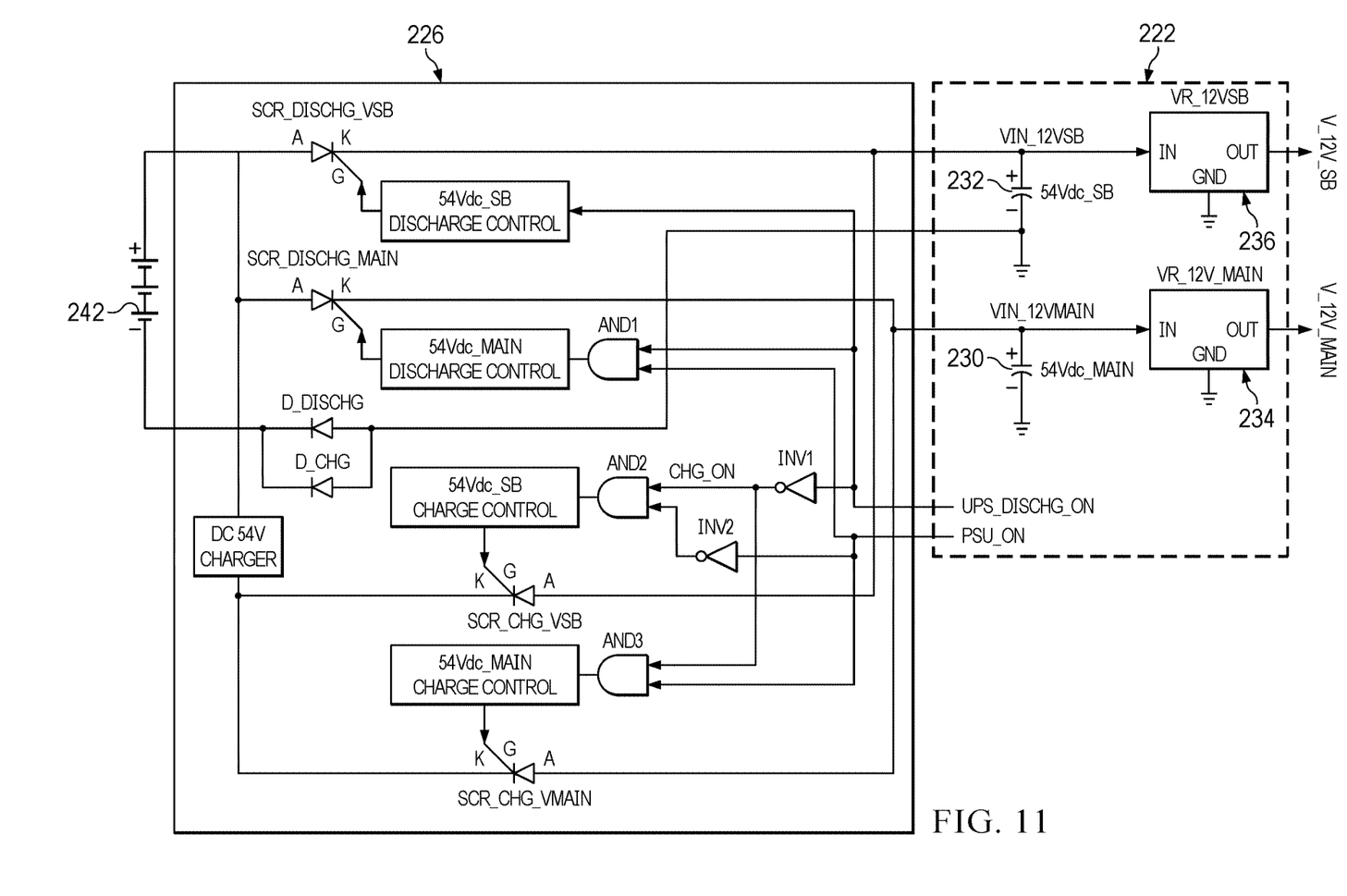
FIG. 11 illustrates a schematic view of the charge control management module of the PSU.

FIG. 10 illustrates a schematic view of the charge control management module 226, continuing the use case example. When the signal UPS_DISCHG_ON is low, the AC input of the rectifier 224 is ready. When PSU_ON is low, the PSU 220 is staying in standby power mode with only V_12V_SB voltage output. Therefore, the AND2 logic gate would drive its output to high to switch SCR_CHG_VSB on. In this mode, the 54Vdc VIN_12VSB on the capacitor 232 and the voltage from the rectifier 224 would supply the power to the DC 54V charger and charge the battery pack 242 with smaller charge current.

Another battery charge mode is when the PSU 220 is in V_12V_MAIN output mode. The signal UPS_DISCHG_ON is still low but the PSU_ON is already switched to high. Therefore, the AND2 gate would be driven to output low and the AND3 would switch to high for driving SCR_CHG_VMAIN on. In this mode, the 54Vdc VIN_12VMAIN on capacitor 230 and from the rectifier 224 would supply the power to the DC 54V charger to charge the battery pack 242 with higher charge current and the server motherboard 250 is powered on in 12V main power mode.

The charge control management module 226 will trigger the battery pack 242 switching to discharge operation when the UPS_DISCHG_ON is high level due to either the AC input not ready or the rectifier 224 unplugged.

When the battery pack 242 is in discharge mode, SCR_DISCHG_VSB would be driven on to maintain the VIN_12VSB voltage on the capacitor 232.

When PSU_ON stays low during the battery discharging phase, SCR_DISCHG_VMAIN would stay off and only the SCR_DISCHG_VSB is driven on to maintain VIN_12VSB voltage on the capacitor 232. However, when PSU_ON is switched to high during discharge mode, SCR_DISCHG_VMAIN would be switched to on state and keep SCR_DISCHG_VSB on as well. The SCR_DISCHG_VMAIN is driven high due to AND1 gate output high. Therefore, the battery 242 would operate in discharge mode to maintain both the VIN_12VSB voltage on the capacitor 232 and the VIN_12VMAIN on the capacitor 230. That allows the battery pack 242 to maintain server motherboard 250 operating for a short period until battery string voltage discharged to low voltage and shut down the server motherboard 250.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, features, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. A server chassis, including:
    a server motherboard;
    a power supply unit (PSU) positioned within a first enclosure of the server chassis, the PSU including:
        a control board coupled to the server motherboard;
        a hot-pluggable rectifier;
        a charge control management module coupled to the control board;
        a first capacitor coupled to the hot-pluggable rectifier;
        a first voltage regulator coupled to the first capacitor and the hot-pluggable rectifier; and
    a battery pack positioned within a second enclosure of the server chassis, the battery pack coupled to the charge control management module;

wherein, when the hot-pluggable rectifier is coupled to the control board and an AC source is coupled to the hot-pluggable rectifier, i) the hot-pluggable rectifier maintains a first voltage on the first capacitor, the first voltage on the first capacitor is input to the first voltage regulator, and the first voltage regulator provides power to the server motherboard through the control board and ii) stores energy, via the charge control management module, at the battery pack, wherein, when the hot-pluggable rectifier is de-coupled from the control board and/or the AC source is de-coupled from the hot-pluggable rectifier, the battery pack provides power to the server motherboard via the charge control management module.

2. The server chassis of claim 1, wherein the control board of the PSU includes:
a second capacitor coupled to the hot-pluggable rectifier; and
a second voltage regulator coupled to the second capacitor and the hot-pluggable rectifier,
wherein, when the hot-pluggable rectifier is de-coupled from the control board and/or the AC source is de-coupled from the hot-pluggable rectifier:
the battery pack maintains a second voltage on the second capacitor,
the second voltage on the second capacitor is input to the second voltage regulator, and
the second voltage regulator provides power to the server motherboard.

3. The server chassis of claim 1, wherein
the hot-pluggable rectifier includes a first edge board,
the charge control management module includes a second edge board,
wherein the hot-pluggable rectifier is coupled to the control board via the first edge board,
wherein the charge control management module is coupled to the control board via the second edge board.

4. The server chassis of claim 3, wherein
the PSU includes a third edge board,
wherein the PSU is coupled to the server motherboard via the third edge board.

5. The server chassis of claim 1, wherein the battery pack includes a plurality of battery cells connected in serial as a single string.

6. The server chassis of claim 1, wherein the battery pack is coupled to the charge control management module via a power cable.

7. A server chassis, including:
an information handling system, including:
a server motherboard;
a power supply unit (PSU) positioned within a first enclosure of the server chassis, the PSU including:
a control board coupled to the server motherboard;
a hot-pluggable rectifier;
a charge control management module coupled to the control board;
a first capacitor coupled to the hot-pluggable rectifier;
a first voltage regulator coupled to the first capacitor and the hot-pluggable rectifier; and
a battery pack positioned within a second enclosure of the server chassis, the battery pack coupled to the charge control management module, wherein, when the hot-pluggable rectifier is coupled to the control board and an AC source is coupled to the hot-pluggable rectifier, i) the hot-pluggable rectifier maintains a first voltage on the first capacitor, the first voltage on the first capacitor is input to the first voltage regulator, and the first voltage regulator provides power to the server motherboard through the control board and ii) stores energy, via the charge control management module, at the battery pack, wherein, when the hot-pluggable rectifier is de-coupled from the control board and/or the AC source is de-coupled from the hot-pluggable rectifier, the battery pack provides power to the server motherboard via the charge control management module.

8. The server chassis of claim 7, wherein the control board of the PSU includes:
a second capacitor coupled to the hot-pluggable rectifier; and
a second voltage regulator coupled to the second capacitor and the hot-pluggable rectifier,
wherein, when the hot-pluggable rectifier is de-coupled from the control board and/or the AC source is de-coupled from the hot-pluggable rectifier:
the battery pack maintains a second voltage on the second capacitor,
the second voltage on the second capacitor is input to the second voltage regulator, and
the second voltage regulator provides power to the server motherboard.

9. The server chassis of claim 7, wherein
the hot-pluggable rectifier includes a first edge board,
the charge control management module includes a second edge board,
wherein the hot-pluggable rectifier is coupled to the control board via the first edge board,
wherein the charge control management module is coupled to the control board via the second edge board.

10. The server chassis of claim 9, wherein
the PSU includes a third edge board,
wherein the PSU is coupled to the server motherboard via the third edge board.

11. The server chassis of claim 7, wherein the battery pack includes a plurality of battery cells connected in serial as a single string.

12. The server chassis of claim 7, wherein the battery pack is coupled to the charge control management module via a power cable.

* * * * *